(12) United States Patent
Nambu et al.

(10) Patent No.: US 12,434,649 B2
(45) Date of Patent: Oct. 7, 2025

(54) FRONT VEHICLE-BODY STRUCTURE (71) Applicant: HONDA MOTOR CO., LTD., Tokyo (JP)

(72) Inventors: Masaki Nambu, Tokyo (JP); Takehiro Kondo, Tokyo (JP); Hiroyuki Anzai, Tokyo (JP); Shota Anegawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 371 days.

(21) Appl. No.: 18/160,652

(22) Filed: Jan. 27, 2023

(65) Prior Publication Data
US 2023/0271581 A1 Aug. 31, 2023

(30) Foreign Application Priority Data

Feb. 25, 2022 (JP) .................................. 2022-028431

(51) Int. Cl.
*B62D 25/08* (2006.01)
*B60R 19/24* (2006.01)
*B62D 21/15* (2006.01)
*B60R 19/18* (2006.01)

(52) U.S. Cl.
CPC .............. *B60R 19/24* (2013.01); *B62D 25/08* (2013.01); *B60R 2019/1813* (2013.01); *B62D 21/152* (2013.01); *B62D 25/082* (2013.01)

(58) Field of Classification Search
CPC .... B62D 21/152; B62D 25/08; B62D 25/082; B62D 25/084; B62D 25/085; B62D 27/023
USPC ........................... 296/187.09, 193.09, 203.02
See application file for complete search history.

(56) References Cited

U.S. PATENT DOCUMENTS

| 2011/0101735 A1* | 5/2011 | Fujita .................... B62D 25/082 296/193.06 |
| 2012/0074731 A1* | 3/2012 | Yoshida ............. B62D 25/2018 296/193.05 |
| 2016/0207573 A1* | 7/2016 | Kitakata ................. B60R 19/12 |
| 2016/0244097 A1 | 8/2016 | Kondo et al. |
| 2017/0088180 A1 | 3/2017 | Takeda et al. |

(Continued)

FOREIGN PATENT DOCUMENTS

| CN | 105905169 A | 8/2016 |
| CN | 106995011 A | 8/2017 |

(Continued)

OTHER PUBLICATIONS

Japanese Office Action received in corresponding Japanese application No. 2022-028431 issued Jun. 13, 2023 with English translation (6 pages).

(Continued)

*Primary Examiner* — Gregory A Blankenship
(74) *Attorney, Agent, or Firm* — Rankin, Hill & Clark LLP (57) ABSTRACT

A front vehicle-body structure includes: a lower member extending in a vehicle front-rear direction and extending upward toward the rear; and an upper member extending in the vehicle front-rear direction from a rear end of the lower member. The lower member and the upper member are coupled to each other on a plurality of pairs of surfaces, and coupling portions coupling surfaces of the lower member with surfaces of the upper member are offset from each other in the vehicle front-rear direction.

8 Claims, 5 Drawing Sheets

(56) References Cited

U.S. PATENT DOCUMENTS

| | | | |
|---|---|---|---|
| 2019/0009820 A1* | 1/2019 | Kondo | B62D 25/08 |
| 2019/0047632 A1* | 2/2019 | Kim | B60G 13/003 |
| 2019/0168816 A1* | 6/2019 | Kondo | B62D 25/088 |
| 2019/0276094 A1* | 9/2019 | Kondo | B62D 25/08 |
| 2020/0140015 A1* | 5/2020 | Kondo | B62D 21/152 |
| 2021/0291909 A1* | 9/2021 | Hasegawa | B62D 25/08 |
| 2022/0081036 A1* | 3/2022 | Abiko | B62D 25/085 |
| 2022/0194474 A1* | 6/2022 | Kim | B62D 25/14 |
| 2022/0266910 A1* | 8/2022 | Kim | B62D 21/152 |
| 2022/0274648 A1* | 9/2022 | Li | B62D 21/152 |
| 2023/0271581 A1* | 8/2023 | Nambu | B62D 25/08 296/187.09 |
| 2023/0271582 A1* | 8/2023 | Kondo | B60R 19/24 293/155 |
| 2023/0391178 A1* | 12/2023 | Yang | B62D 21/02 |
| 2024/0075987 A1* | 3/2024 | Matecki | B62D 21/02 |
| 2024/0190511 A1* | 6/2024 | Kim | B62D 25/145 |

FOREIGN PATENT DOCUMENTS

| | | |
|---|---|---|
| CN | 109204531 A | 1/2019 |
| CN | 109496191 A | 3/2019 |
| CN | 116654106 A | 8/2023 |
| JP | 2013-193572 A | 9/2013 |
| JP | 2017-218009 A | 12/2017 |

OTHER PUBLICATIONS

Chinese Office Action received in corresponding Chinese application No. 202310026814.1 dated Jul. 25, 2025 with English translation (13 pages).

* cited by examiner

FRONT VEHICLE-BODY STRUCTURE

CROSS-REFERENCE TO RELATED APPLICATION

The present application claims the benefit of priority to Japanese Patent Application No. 2022-028431 filed on Feb. 25, 2022, the disclosures of all of which are hereby incorporated by reference in their entireties.

TECHNICAL FIELD

Field of the Invention

The present invention relates to a structure of a vehicle.

Related Art

In recent years, there has been a demand for improving fuel efficiency of automobiles, in view of improving the global environment to prevent natural disasters. At the same time, there has been a demand for maintaining or improving collision safety of vehicles. To satisfy these demands, high-strength and lightweight vehicle body structures have been developed. For frames, which are structural members for vehicles to form frameworks of the vehicle bodies, steel plates for forming the frames have been made stronger and thinner to reduce weight of the body structures while maintaining conventional collision performance. As a front vehicle-body structure, JP Patent Application Publication No. 2013-193572 (referred to as Patent Literature 1 hereinbelow) describes a structure with a lower member extending in a vehicle front-rear direction and extending upward toward the rear, and an upper member coupled to a rear end of the lower member and extending in the vehicle front-rear direction.

SUMMARY OF THE INVENTION

With the structure, when a vehicle collides, a part of a front collision load is transmitted from the lower member to the upper member. When the load is concentrated locally at a coupling portion of coupling the lower member with the upper member, there is a risk that the coupling portion may be lapped (broken).

The present invention has been made in view of the aforementioned points, and is intended to provide a front vehicle-body structure capable of suitably receiving a front collision load at coupling portions coupling a lower member with an upper member.

To achieve this objective, the present invention provides a front vehicle-body structure including: a lower member extending in a vehicle front-rear direction and extending upward toward the rear; and an upper member extending in the vehicle front-rear direction from a rear end of the lower member, wherein the lower member and the upper member are coupled to each other on a plurality of pairs of surfaces, and coupling portions coupling surfaces of the lower member with surfaces of the upper member are offset from each other in the vehicle front-rear direction.

The present invention provides the front vehicle-body structure capable of suitably receiving a front collision load at the coupling portions coupling the lower member with the upper member.

DESCRIPTION OF THE EMBODIMENTS

Next, a description is given in detail of an embodiment of the present invention, taking a case where a front vehicle-body structure of the present invention is applied to a left side of a vehicle as an example, with reference to the drawings as appropriate. In the drawings, "front-rear" refers to a vehicle front-rear direction, and "right-left" refers to a right-left direction (vehicle width direction) as viewed from a driver's seat, respectively.

Figure 1:
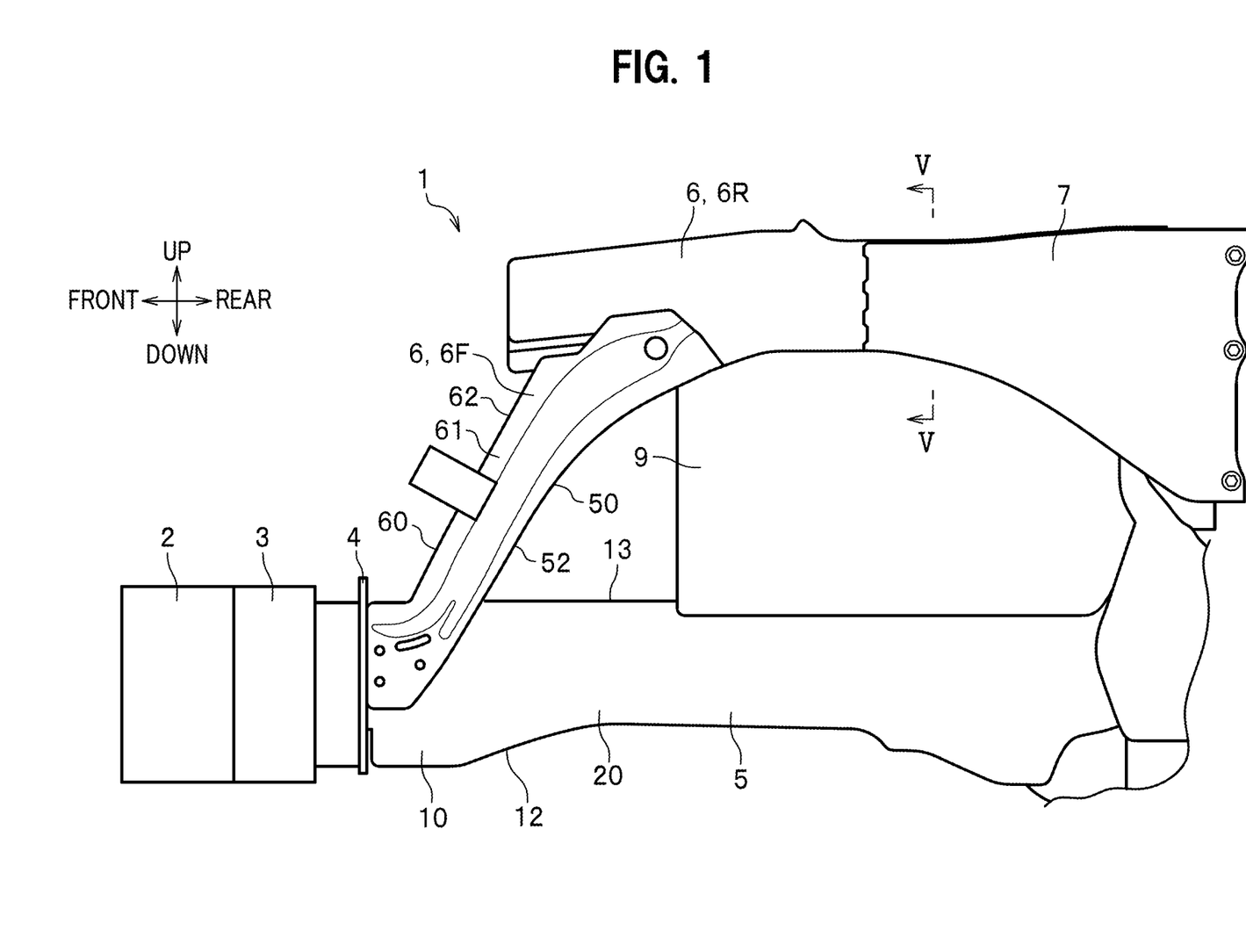
FIG. 1 is a schematic side view of a front vehicle-body structure according to an embodiment of the present invention.
Figure 2:
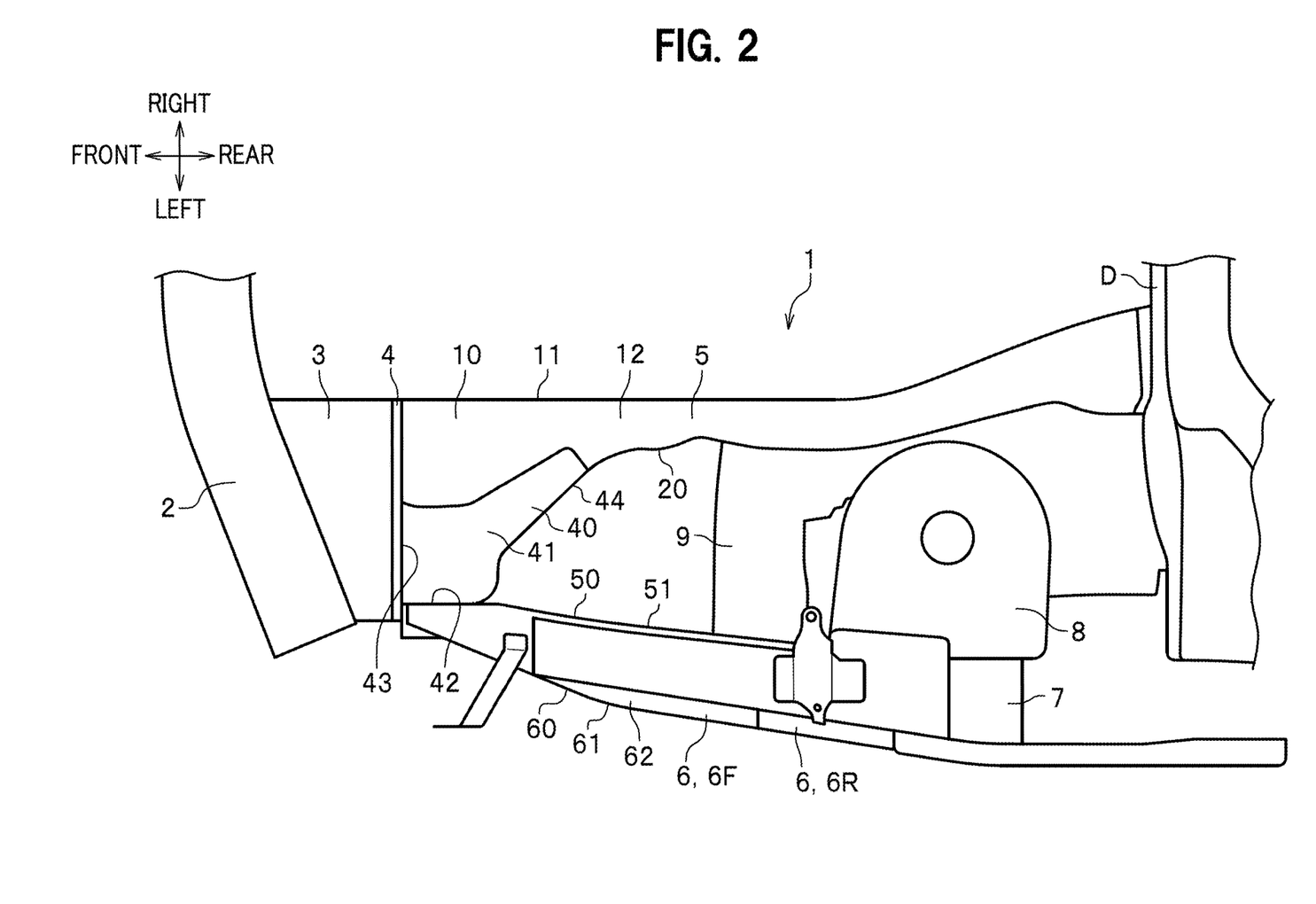
FIG. 2 is a schematic plan view of the front vehicle-body structure according to the embodiment of the present invention.

As shown in FIGS. 1 and 2, a front vehicle-body structure 1 of the embodiment of the present invention includes a bumper beam 2, an extension 3, a bracket 4, a front side frame 5, a lower member 6, an upper member 7, a damper base 8, and a damper housing 9.

<Bumper Beam>

The bumper beam 2 is a metal framework member extending in the vehicle width direction at a front end of the vehicle.

<Extension>

The extension 3 is a metal framework member extending rearward from an end in the vehicle width direction of the bumper beam 2. The extension 3 has a substantially rectangular closed cross-sectional shape in a front view and transmits a front collision load applied to the bumper beam 2 via the bracket 4 to the front side frame 5 and the lower member 6 on a rear side thereof.

<Bracket>

The bracket 4 is a metal plate member for coupling a rear end of the extension 3 to front ends of the front side frame 5 and the lower member 6.

<Front Side Frame>

The front side frame 5 is a metal framework member extending in a vehicle front-rear direction at a front of the vehicle body. The front side frame 5 has a substantially rectangular closed cross-sectional shape in a front view. A rear end of the front side frame 5 is coupled to a dashboard D to separate a power compartment from a passenger compartment. An outer end in the vehicle width direction of the front side frame 5 is inclined outward in the vehicle width direction toward the front of the vehicle body. The front side frame 5 includes an inner front side frame 10, an outer front side frame 20, a lower extension (not shown), and an upper extension 40.

<<Inner Front Side Frame>>

The inner front side frame 10 integrally includes an inner wall 11, a lower wall 12 extending outward in the vehicle width direction from a lower end of the inner wall 11, and an upper wall 13 extending outward in the vehicle width direction from an upper end of the inner wall 11. In addition, the inner front side frame 10 integrally includes a lower flange extending downward from an outer end in the vehicle width direction of the lower wall 12 and an upper flange extending upward from an outer end in the vehicle width direction of the upper wall 13.

<<Outer Front Side Frame>>

The outer front side frame 20 forms an outer wall of the front side frame 5. The outer front side frame 20 is joined, at a lower end thereof, to the lower flange of the inner front side frame 10 by welding or the like. The outer front side frame 20 is joined, at an upper end thereof, to the upper flange of the inner front side frame 10 by welding or the like.

<<Lower Extension>>

The lower extension forms an outer portion in the vehicle width direction, at front ends, of the outer wall in the vehicle width direction and the lower wall of the front side frame 5. The lower extension integrally includes a lower wall and a rear wall extending upward from a rear end of the lower wall. The front end of the lower wall is joined to the bracket 4 by welding or the like.

<<Upper Extension>>

The upper extension 40 forms an outer portion in the vehicle width direction, at a front end, of the upper wall of the front side frame 5. The upper extension 40 integrally includes an upper wall 41, an outer flange 42 extending upward from an outer end in the vehicle width direction of the upper wall 41, a front flange 43 extending upward from a front end of the upper wall 41, and a rear flange 44 extending upward from a rear end of the upper wall 41. The upper wall 41 is, at an inner end in the vehicle direction thereof, joined to the outer end in the vehicle width direction of the upper wall 13 of the inner front side frame 10, by welding or the like. A rear portion of the outer flange 42 is joined to an inner wall 51 of a front inner lower member 50, to be described below, by welding or the like. A front portion of the outer flange 42 is joined to an outer wall 61 of a front outer lower member 60, to be described below, by welding or the like. The front flange 43 is joined to the bracket 4 by welding or the like. The rear flange 44 is joined to an upper end of the rear wall of the lower extension by welding or the like.

<Lower Member>

The lower member 6 is a metal framework member extending in the vehicle front-rear direction at the front of the vehicle body. The lower member 6 is provided on an outer side in the vehicle width direction of the front side frame 5 and inclined upward toward the rear. An inner end in the vehicle width direction of the lower member 6 extends in the vehicle front-rear direction, without inclining inward in the vehicle width direction toward the front of the vehicle body.

The lower member 6 is formed with a front lower member 6F and a rear lower member 6R combined with each other.

<Front Lower Member>

The front lower member 6F is a member forming a front portion of the lower member 6. The front lower member 6F is inclined upward toward the rear. The front lower member 6F is formed with the front inner lower member 50 and the front outer lower member 60 combined with each other.

<<Front Inner Lower Member>>

The front inner lower member 50 integrally includes the inner wall 51 and a lower wall 52 extending outward in the vehicle width direction from a lower end of the inner wall 51. The lower wall 52 has a shape becoming narrower toward the front. A front end of the lower wall 52 is positioned behind a front end of the inner wall 51. The front end of the lower wall 52 is joined to a rear wall of the lower extension by welding or the like.

<<Front Outer Lower Member>>

The front outer lower member 60 integrally includes the outer wall 61 and an upper wall 62 extending inward in the vehicle width direction from an upper end of the outer wall 61. The upper wall 62 has a shape becoming narrower toward the front and ends behind a front end of the front outer lower member 60. A front end of the outer wall 61 is positioned in front of the front end of the inner wall 51 and is disposed at the same position in the vehicle width direction as an outer wall of the extension 3 and the inner wall 51 of the front inner lower member 50. That is, the front end of the lower member 6 is continuous to the outer wall (outer end in the vehicle width direction) of the extension 3 in the vehicle front-rear direction.

In addition, the front outer lower member 60 integrally includes an outer flange extending outward in the vehicle width direction from a lower end of the outer wall 61 and an upper flange extending upward from an upper end of the upper wall 62. The outer flange is joined to an outer end in the vehicle width direction of the lower wall 52 by welding or the like. The upper flange is joined to an upper end of the inner wall 51 by welding or the like.

<Rear Lower Member>

The rear lower member 6R is a member forming a rear portion of the lower member 6. The rear lower member 6R extends in the vehicle front-rear direction, and has a rear end of the front inner lower member 50 joined to a front lower end thereof by welding or the like. A front end of the rear lower member 6R is joined to a front bulkhead (not shown) by welding or the like. The rear lower member 6R is formed with a rear inner lower member 70 and a rear outer lower member 80 combined with each other.

<<Rear Inner Lower Member>>

The rear inner lower member 70 integrally includes an inner wall 71 and a lower wall 72 extending outward in the vehicle width direction from a lower end of the inner wall 71.

The lower wall 72 is formed with ridgelines A1 and A2 extending in the vehicle front-rear direction. In the lower wall 72, a portion thereof located inner in the vehicle width direction than the ridgeline A1, which is located inner in the vehicle width direction than the ridgeline A2, is positioned higher than a portion thereof located outer in the vehicle width direction than the ridgeline A2, which is located outer in the vehicle width direction than the ridgeline A1.

<<Rear Outer Lower Member>>

The rear outer lower member 80 integrally includes an outer wall 81 and an upper wall 82 extending inward in the vehicle width direction from an upper end of the outer wall 81. In addition, the rear outer lower member 80 integrally includes an outer flange 83 extending outward in the vehicle width direction from a lower end of the outer wall 81 and an upper flange 84 extending upward from an upper end of the upper wall 82. The outer flange 83 is joined to an outer end in the vehicle width direction of the lower wall 72 by welding or the like. The upper flange 84 is joined to an upper end of the inner wall 71 by welding or the like.

<Upper Member>

The upper member 7 is a metal framework member extending in the vehicle front-rear direction at the front of the vehicle body. A front end of the upper member 7 has a rear end of the rear lower member 6R joined thereto by welding or the like. A rear end of the upper member 7 is joined to the front pillar (not shown) by welding or the like. The upper member 7 is formed with an inner upper member 90, an outer upper member 100, and a top (an upper) upper member 110 combined with each other.

<Inner Upper Member>

The inner upper member 90 integrally includes an inner wall 91 and a lower wall 92 extending outward in the vehicle width direction from a lower end of the inner wall 91. In addition, the inner upper member 90 integrally includes a front flange 93 extending forward from the front ends of the inner wall 91 and the lower wall 92.

The lower wall 92 is formed with ridgelines A3 and A4 extending in the vehicle front-rear direction. The ridgeline A3 is positioned on an extension line of the ridgeline A1, and the ridgeline A4 is positioned on an extension line of the ridgeline A2. In the lower wall 92, a portion thereof located inner in the vehicle width direction than the ridgeline A3, which is located inner in the vehicle width direction than the ridgeline A4, is positioned higher than a portion thereof located outer in the vehicle width direction than the ridgeline A4, which is located outer in the vehicle width direction than the ridgeline A3. The front flange 93 is located inner in the vehicle width direction than the ridgeline A3.

<<Outer Upper Member>>

The outer upper member 100 integrally includes an outer wall 101, a lower flange 102 extending outward in the vehicle width direction from a lower end of the outer wall 101, and an upper flange 103 extending outward in the vehicle width direction from an upper end of the outer wall 101. The lower flange 102 is joined to an outer end in the vehicle width direction of the lower wall 92 by welding or the like.

<<Top Upper Member>>

The top upper member 110 forms an upper wall of the upper member 7. The top upper member 110 has an inner end in the vehicle width direction thereof joined to an upper end of the inner wall 91 by welding or the like. The top upper member 110 has an outer end in the vehicle width direction thereof joined to the upper flange 103 by welding or the like.

<Damper Base>

As shown in FIGS. 1 and 2, the damper base 8 is a member to support a damper suspending a front wheel of the vehicle. The damper base 8 is joined to inner sides in the vehicle width direction of a rear end of the lower member 6F and the front end of the upper member 7 by welding or the like.

<Damper Housing>

The damper housing 9 is a member to cover the damper suspending the front wheel of the vehicle from inside in the vehicle width direction. An upper end of the damper housing 9 is joined to a lower end of the damper base 8 by welding or the like, and a lower end of the damper housing 9 is joined to the front side frame 5 by welding or the like.

<Coupling Structure Between Rear Lower Member and Upper Member>

Figure 3:
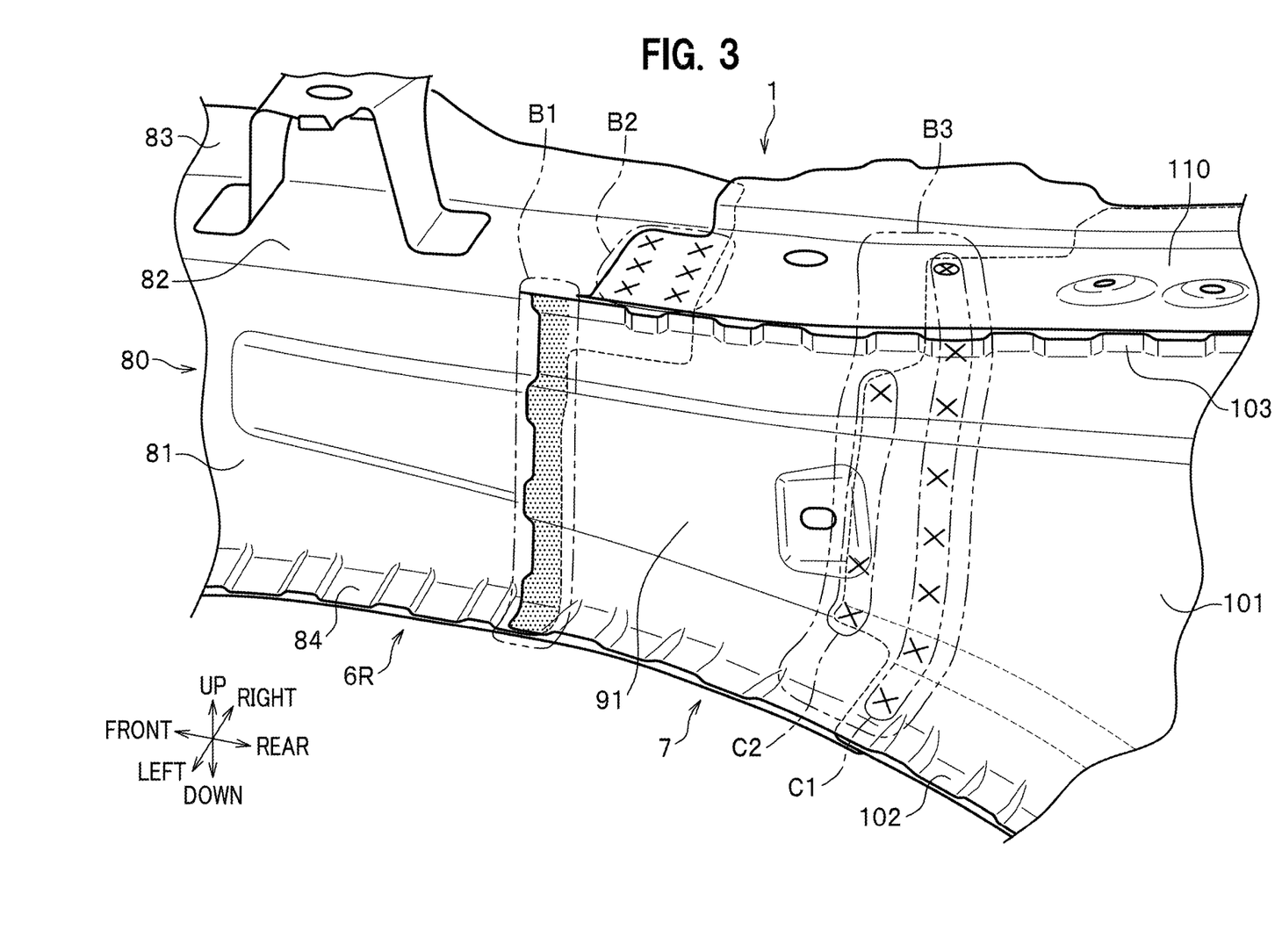
FIG. 3 is a partially enlarged view of the front vehicle-body structure in FIG. 1, and is a partially broken perspective view of coupling portions coupling a lower member with an upper member as viewed from outside in a vehicle width direction.
Figure 4:
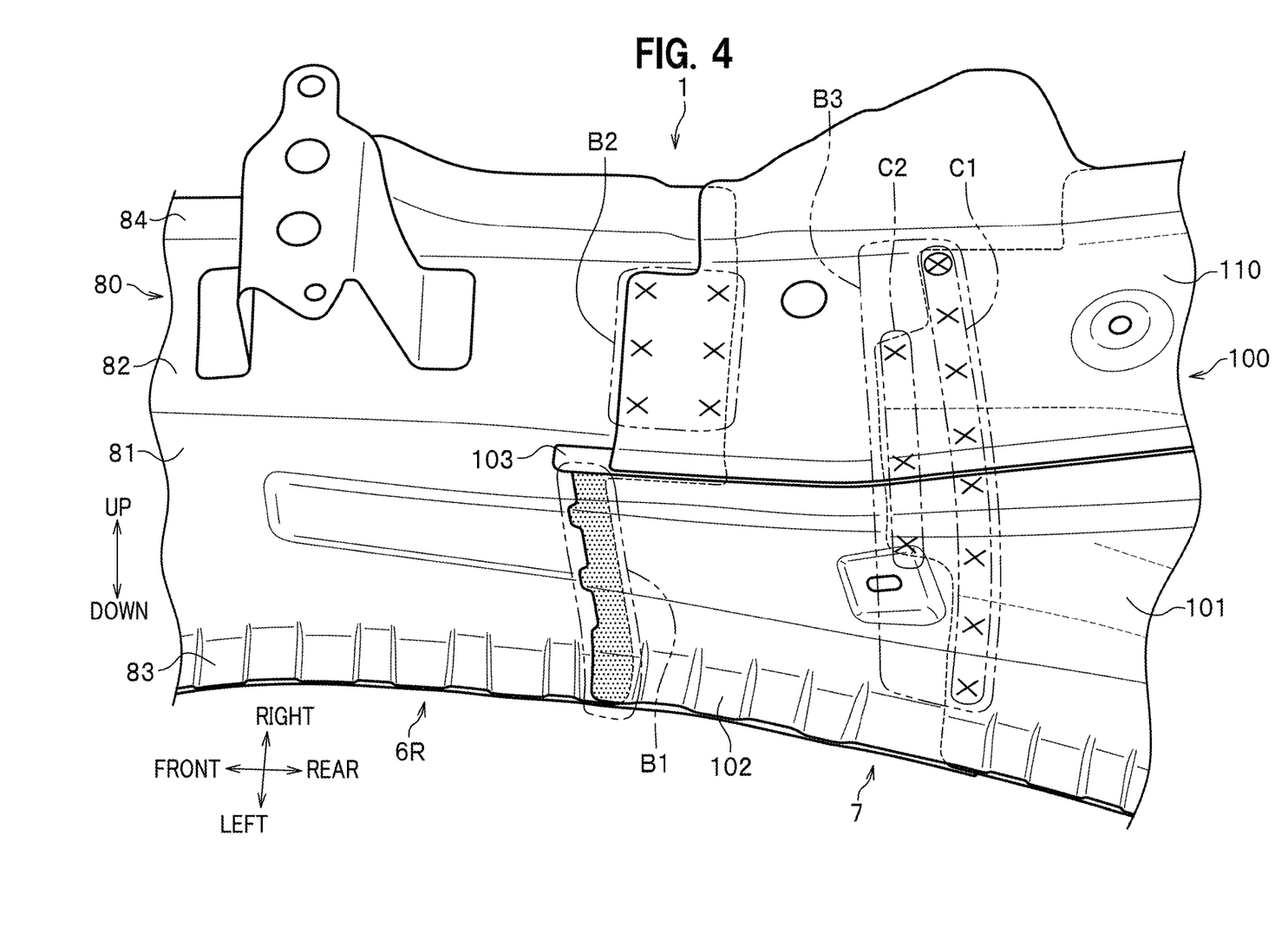
FIG. 4 is a partially enlarged view of the front vehicle-body structure in FIG. 1, and is a partially broken perspective view of the coupling portions coupling the lower member with the upper member as viewed from above.
Figure 5:
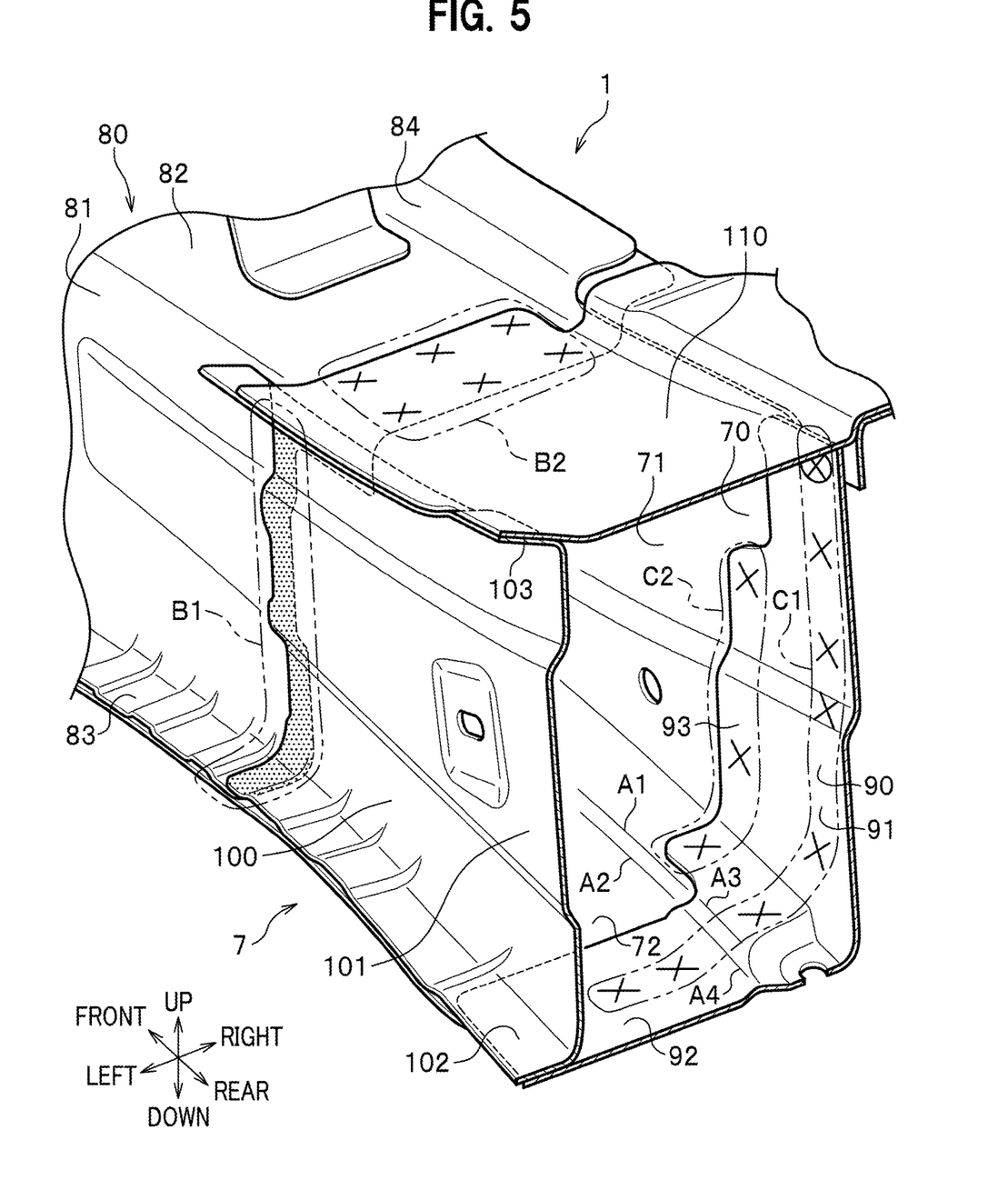
FIG. 5 is a cross-sectional view, taken along a line V-V in FIG. 1.

As shown in FIGS. 3 to 5, a rear end of the outer wall (outer side surface in the vehicle width direction) 81 of the rear lower member 6R and a front end of the outer wall (outer side surface in the vehicle width direction) 101 of the upper member 7 are joined to each other at a coupling portion B1 by MIG (Metal Inert Gas Welding) welding. Here, lower ends of the rear lower member 6R and upper member 7 each have an arc shape that is convex upward in a side view, and the coupling portion B1 is positioned at a top of the arc shape. Note that the joining by MIG welding at the coupling portion B1 is performed after joining at coupling portions B2 and B3 described below by spot welding, to tolerate assembly errors.

A rear end of the upper wall (upper surface) 82 of the rear lower member 6R and a front end of the top upper member (upper wall, upper surface) 110 of the upper member 7 are joined to each other at the coupling portion B2 behind the coupling portion B1 by spot welding. In the coupling portion B2, spot welding joint points (see X marks in the drawings) are set in two (front and rear) rows.

Rear ends of the inner wall (inner side surface in the vehicle width direction) 71 and lower wall (lower surface) 72 of the rear lower member 6R, and front ends of the inner wall (inner side surface in the vehicle width direction) 91 and lower wall (lower surface) 92 of the upper member 7 are joined to each other at the coupling portion B3 behind the coupling portion B2 by spot welding. At the coupling portion B3, spot welding joint points (see X marks in the drawings) are set in two (front and rear) rows. First joint points C1 on the rear row are set on a front end of a base of the inner upper member 90, and second joint points C2 on the front row are set on the front flange 93 extending forward from the base of the inner upper member 90. On the inner wall 71 of the rear lower member 6R and the inner wall 91 of the upper member 7, the first joint points C1 and the second joint points C2 are alternately set (offset) in the vertical direction. On the lower wall 72 of the rear lower member 6R and the lower wall 92 of the upper member 7, the first joint points C1 and the second joint point C2 are set at the same position in the vehicle width direction.

When the front vehicle-body structure 1 is subjected to a front collision load, an assembly of the rear lower member 6R and the upper member 7 is crushed at a position of the coupling portion B1. Then, the assembly of the rear lower member 6R and the upper member 7 is crushed at a position of the coupling portion B2. The assembly of the rear lower member 6R and the upper member 7 is then crushed at a position of the coupling portion B3. That is, the front vehicle-body structure 1 receives the front collision load at two or more positions offset in the vehicle front-rear direction and is flatly crushed little by little, so that the assembly of the rear lower member 6R and the upper member 7 is prevented from being lapped at a coupling portion, to suitably receive the front collision load. In addition, the front vehicle-body structure 1 has the coupling portion B1 on the outer side surfaces, which is located in front of the coupling portion B2 on the upper surfaces, so that the front collision load transmitted to the coupling portion B2 is reduced, as compared with a case where the front collision load is firstly received by the coupling portion B2, to prevent the coupling portion B2 from being lapped upward. In addition, since the front vehicle-structure 1 has the coupling portion B3 on the lower surfaces set behind the coupling portion B2 on the upper surfaces, the front collision load can be smoothly transmitted to a lower surface of the upper member 7 which is more widened downward toward the rear.

The front vehicle-body structure 1 of the embodiment of the present invention has the lower member 6, which extends in the vehicle front-rear direction and extends upward toward the rear, and the upper member 7 which extends in the vehicle front-rear direction from the rear end of the lower member 6. The lower member 6 and the upper member 7 are coupled to each other on a plurality of pairs of surfaces. The coupling portions coupling surfaces of the lower member 6 with surfaces of the upper member 7 are offset from each other in the vehicle front-rear direction.

Therefore, the front vehicle-body structure 1 prevents a front collision load, at the coupling portions coupling the lower member 6 with the upper member 7, from being concentrated at the same position in the vehicle front-rear direction, and is flatly crushed little by little without being lapped, to suitably receive the front collision load.

In addition, in the front vehicle-body structure 1, the coupling portions are provided from the front to the rear of the vehicle body in the order of: the coupling portion B1 on the outer side surfaces in the vehicle width direction of the lower and upper members; the coupling portion B2 on the upper surfaces of the lower and upper members; and the coupling portion B3 on the inner side surfaces in the vehicle width direction of the lower and upper members and the lower surfaces of the lower and upper members.

Therefore, the front vehicle-body structure 1 receives a front collision load dispersed to three positions, offset from each other in the vehicle front-rear direction, of the coupling portions coupling the lower member 6 with the upper member 7, to suitably receive the front collision load by being flatly crushed little by little, without being lapped.

In addition, in the front vehicle-body structure 1, at least one of the coupling portions B1 to B3 is joined at two or more positions in the vehicle front-rear direction.

Therefore, the front vehicle-body structure 1, having a broad coupling portion in the vehicle front-rear direction, can suitably prevent the coupling portion from being lapped.

Further, in the front vehicle-body structure 1, the coupling portion B2 on the upper surfaces is joined at two or more positions in the vehicle front-rear direction.

Therefore, the front vehicle-body structure 1, having a broad coupling portion B2 in the vehicle front-rear direction on the upper surfaces, can suitably prevent the coupling portion B2 from being lapped in the vertical direction.

Further, the front vehicle-body structure 1, in the coupling portion B3 on the inner side surfaces and the lower surfaces, has the upper member 7 including the base and the flange 93 extending forward from the base. The coupling portion B3 on the inner side surfaces and the lower surfaces has the first joint points C1 where the lower member 6 and the base are joined to each other and the second joint points C2 where the lower member 6 and the flange 93 are joined to each other.

Therefore, the front vehicle-body structure 1, having a broad coupling portion B3 in the vehicle front-rear direction at the rear, can suitably prevent the coupling portion B3 from being lapped.

Further, in the front vehicle-body structure 1, the first joint points C1 and second joint points C2 on the inner side surfaces are alternately set.

Therefore, the front vehicle-body structure 1 can more suitably prevent the coupling portion B3 at the rear from being lapped.

Further, in the front vehicle-body structure 1, the lower surfaces of the lower member 6 and upper member 7 have the ridgelines A1 and A3 extending in the vehicle front-rear direction, and on the inner side in the vehicle width direction thereof than the ridgelines A1 and A3, the first joint points C1 and the second joint point C2 on the lower surfaces are set at the same position in the vehicle width direction.

Therefore, the front vehicle-body structure 1 can prevent the lower member 6 and the upper member 7 from having gaps therebetween at the ridgelines A1 and A3, and also ensure rigidity (coupling strength) by shapes of the ridgelines A1 and A3 and joint points.

Further, in the front vehicle-body structure 1, the coupling portion B1 on the outer side surfaces is joined by MIG welding.

Therefore, the front vehicle-body structure 1 can tolerate variations in parts and assembly.

Although the embodiment of the present invention has been described above, the present invention is not limited to the embodiment and can be modified as appropriate within the scope of the present invention. For example, the front vehicle-body structure 1 may have a configuration in which a coupling portion on the inner side surfaces in the vehicle width direction and a coupling portion on the lower surfaces are offset from each other in the vehicle front-rear direction.

Further, the present invention can also be applied to coupling portions coupling the front lower member 6F with the rear lower member 6R. In this case, it is assumed that the front lower member 6F is a lower member, the rear lower member 6R is a front upper member forming a front portion of an upper member, and the upper member 7 is a rear upper member forming a rear portion of the upper member. In this case, at the very front, an upper wall of the lower member (front lower member 6F described above) is coupled to a lower wall of the upper member (rear lower member 6R described above). Further, at the rear of the very front, an outer wall of the lower member (front lower member 6F described above) is coupled to an outer wall of the upper member (rear lower member 6R described above). Also, at the rear of the position described immediately above, an inner wall and a lower wall of the lower member (front lower member 6F described above) are coupled to an inner wall and a lower wall of the upper member (rear lower member 6R described above), respectively.

What is claimed is:

1. A front vehicle-body structure comprising:
a lower member extending in a vehicle front-rear direction and extending upward toward the rear; and
an upper member extending in the vehicle front-rear direction from a rear end of the lower member, wherein
the lower member and the upper member are coupled to each other on a plurality of pairs of surfaces,
coupling portions coupling surfaces of the lower member with surfaces of the upper member are offset from each other in the vehicle front-rear direction, and
the coupling portions are provided from a front to a rear of a vehicle body in the order of: the coupling portion on outer side surfaces in a vehicle width direction of the lower and upper members; the coupling portion on upper surfaces of the lower and upper members; and the coupling portion on inner side surfaces in the vehicle width direction of the lower and upper members and lower surfaces of the lower and upper members.

2. A front vehicle-body structure comprising:
a lower member extending in a vehicle front-rear direction and extending upward toward the rear; and
an upper member extending in the vehicle front-rear direction from a rear end of the lower member, wherein
the lower member and the upper member are coupled to each other on a plurality of pairs of surfaces,
coupling portions coupling surfaces of the lower member with surfaces of the upper member are offset from each other in the vehicle front-rear direction,
at least one of the coupling portions is joined at two or more positions in the vehicle front-rear direction,
in the coupling portion on inner side surfaces in a vehicle width direction of the lower and upper members and lower surfaces of the lower and upper members, the upper member includes a base and a flange extending forward from the base, and
the coupling portion on the inner side surfaces and the lower surfaces has first joint points where the lower member and the base are joined to each other and second joint points where the lower member and the flange are joined to each other.

3. The front vehicle-body structure according to claim 2, wherein the first joint points and second joint points on the inner side surfaces are alternately set.

4. The front vehicle-body structure according to claim 2, wherein the lower surfaces of the lower and upper members have ridgelines extending in the vehicle front-rear direction, and on an inner side in the vehicle width direction thereof than the ridgelines, the first joint points and the second joint point on the lower surfaces are set at the same position in the vehicle width direction.

5. The front vehicle-body structure according to claim 1, wherein the coupling portion on the outer side surfaces is joined by MIG welding.

6. The front vehicle-body structure according to claim 1, wherein at least one of the coupling portions is joined at two or more positions in the vehicle front-rear direction.

7. The front vehicle-body structure according to claim 6, wherein the coupling portion on the upper surfaces is joined at two or more positions in the vehicle front-rear direction.

8. The front vehicle-body structure according to claim 6, wherein in the coupling portion on inner side surfaces in a vehicle width direction of the lower and upper members and lower surfaces of the lower and upper members, the upper member includes a base and a flange extending forward from the base, and
    the coupling portion on the inner side surfaces and the lower surfaces has first joint points where the lower member and the base are joined to each other and second joint points where the lower member and the flange are joined to each other.

\* \* \* \* \*